United States Patent [19]
Wu

[11] Patent Number: 5,605,076
[45] Date of Patent: Feb. 25, 1997

[54] SWIVEL MECHANISM FOR A BICYCLE

[76] Inventor: Chin-chang Wu, No. 19, Lane 108, Yungfeng Rd., Taiping Village, Taiping Hsiang, Taichung Hsien, Taiwan

[21] Appl. No.: 521,070

[22] Filed: Aug. 29, 1995

[51] Int. Cl.$^6$ .................................................. B62K 21/18
[52] U.S. Cl. ........................ 74/551.1; 74/502.6; 280/279
[58] Field of Search ............................... 74/502.4, 502.6, 74/551.1, 551.8; 280/279, 280

[56] References Cited

U.S. PATENT DOCUMENTS

| | | | |
|---|---|---|---|
| 4,616,523 | 10/1986 | Jones | 280/279 |
| 4,653,768 | 3/1987 | Keys et al. | 74/551.1 |
| 4,753,448 | 6/1988 | Nagashima | 280/279 |
| 4,770,435 | 9/1988 | Cristie | 280/279 |

Primary Examiner—Charles A. Marmor
Assistant Examiner—Mary Ann Battista
Attorney, Agent, or Firm—Poms, Smith, Lande & Rose

[57] ABSTRACT

A swivel mechanism for a bicycle includes a base fixedly mounted around a head tube of the bicycle. An annular sleeve is rotatably mounted around the base. A swivel ring is rotatably mounted between the upperside of the base and an underside of the annular sleeve. A cap is securely mounted around an upper end of a steerer tube of the bicycle. An upper connector has at least one first brake cable fixedly mounted on an outer periphery of the cap. A first wire is slidably mounted in the first brake cable and has a lower end fixedly mounted on an outer periphery of the annular sleeve. A lower connector has at least one second brake cable fixedly mounted on an outer periphery of the base. A second wire is slidably mounted in the second brake cable and has an upper end fixedly mounted on an outer periphery of the swivel ring.

8 Claims, 2 Drawing Sheets

SWIVEL MECHANISM FOR A BICYCLE

BACKGROUND OF THE INVENTION

1. Field of Invention

The present invention relates to a swivel mechanism, and more particularly to a swivel mechanism for a bicycle which is used for stunt riding.

2. Related Prior Art

A conventional bicycle has a handlebar which can not rotate along a horizontal plane thereof freely due to limitation of brake cables which are fixedly mounted on two sides of the handlebar such that the bicycle is not available for as performing stunts or tricks, thereby greatly influencing the facility of the bicycle.

The present invention has arisen to mitigate and/or obviate the above-mentioned problems.

SUMMARY OF TEE INVENTION

The primary objective of the present invention is to provide a swivel mechanism with great utility and stability.

In accordance with one aspect of the present invention, there is provided a swivel mechanism for a bicycle which comprises a head tube and a steerer tube rotatably mounted therein. The swivel mechanism comprises a base fixedly mounted around an upper end of the head tube and having an annular flange formed on an upperside thereof and extending upwardly therefrom. An annular sleeve is rotatably mounted around the annular flange. A swivel ring is mounted on the upperside of the base and is rotatably mounted around an underside of the annular sleeve. A cap is securely mounted around an upper end of the steerer tube.

A separating brake module comprises an upper connector including at least one first brake cable fixedly mounted on an outer periphery of the cap. A first wire is slidably mounted in the first brake cable and has a lower end fixedly mounted on an outer periphery of the annular sleeve. A lower connector includes at least one second brake cable fixedly mounted on an outer periphery of the base. A second wire is slidably mounted in the second brake cable and has an upper end fixedly mounted on an outer periphery of the swivel ring.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
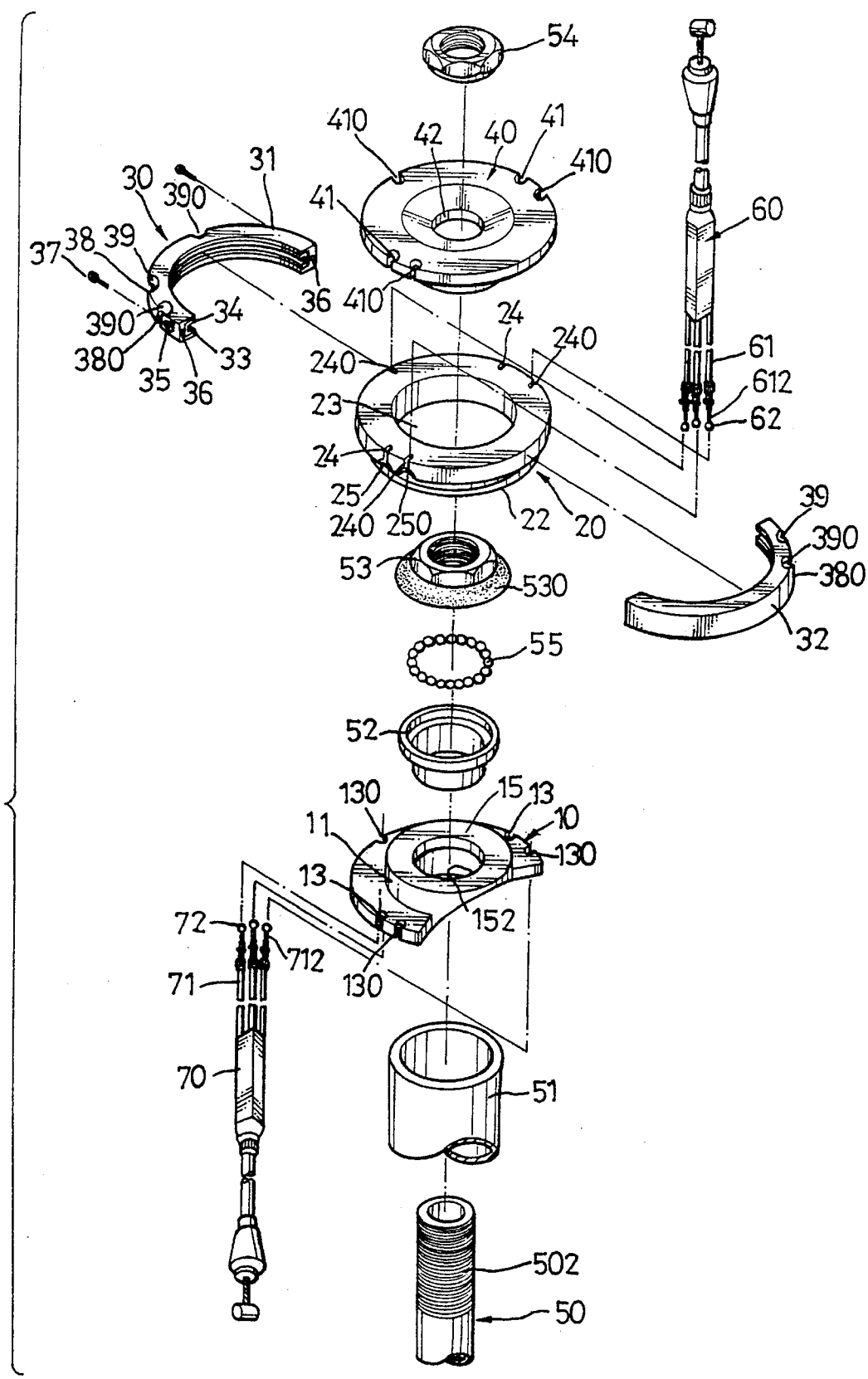
FIG. 1 is a perspective exploded view of a swivel mechanism in accordance with the present invention.
Figure 2:
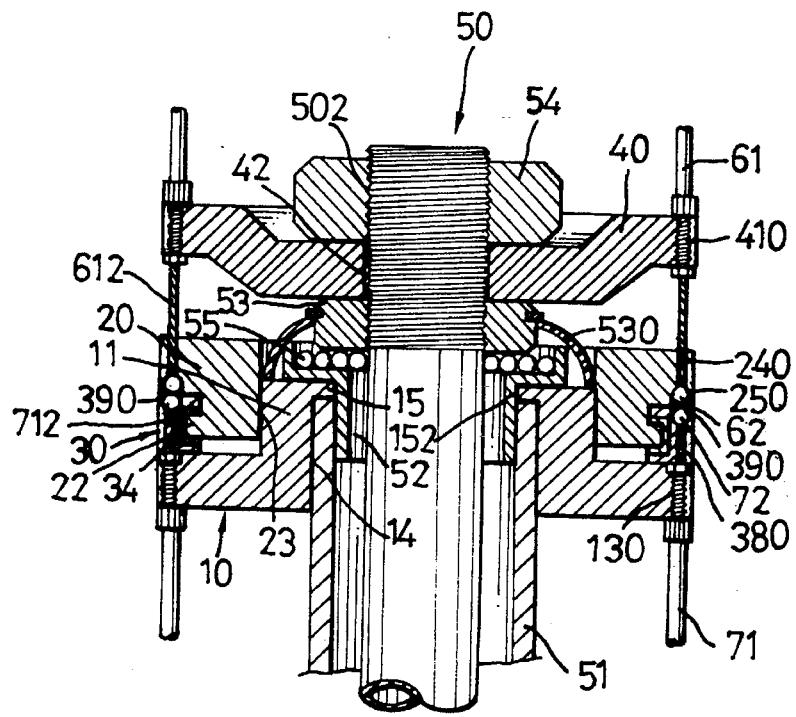
FIG. 2 is a front plan cross-sectional view of FIG. 1.

Referring to the drawings and initially to FIGS. 1 and 2, a swivel mechanism in accordance with the present invention is provided for a bicycle such as a stunt (or trick) bicycle and the like which is available for special effects. The bicycle comprises a head tube 51 and a steerer tube 50 rotatably mounted therein.

In general, the swivel mechanism comprises a base 10 fixedly mounted around an upper end of the head tube 51 and having an annular flange 11 formed on an upperside thereof and extending upwardly therefrom. An annular sleeve 20 is rotatably mounted around the annular flange 11 of the base 10. A swivel ring 30 is mounted on the upperside of the base 10 and is rotatably mounted around an underside of the annular sleeve 20. A cap 40 is securely mounted around an upper end of the steerer tube 50.

A separating brake module comprises an upper connector 60 including at least one, preferably three, first brake cables 61 fixedly mounted on an outer periphery of the cap 40. Three first wires 612 are each slidably mounted in a corresponding one of the three first brake cables 61 and each have a lower end fixedly mounted on an outer periphery of the annular sleeve 20. A lower connector 70 includes at least one, preferably three, second brake cables 71 fixedly mounted on an outer periphery of the base 10. Three second wires 712 are each slidably mounted in a corresponding one of the three second brake cables 71 and each have an upper end fixedly mounted on an outer periphery of the swivel ring 30.

Preferably, the annular sleeve 20 has an annular ridge 22 laterally formed on an underside thereof. A groove 33 is defined in an inner periphery of the swivel ring 30. A self-lubricating bearing 34 is rotatably received in the groove 33 and is rotatably mounted on the annular ridge 22 such that the annular sleeve 20 is able to rotate relative to the swivel ring 30 via the self-lubricating bearing 34.

In addition, the swivel ring 30 preferably includes first and second semi-circular half bodies 31 and 32 detachably coupled together. There are two threaded bores 36 each transversely defined through one distal end of the first half body 31 and each communicating with a corresponding one of two threaded bores (not shown) which are each defined in one distal end of the second half body 32.

In assembly, two engaging bolts 37 each threadedly extend through a corresponding one of the two threaded bores 36 of the first body 31 and each threadedly extend through the associated threaded bore of the second half body 32, thereby coupling the two half bodies 31 and 32 together. Preferably, there are two cut slots 35 each laterally defined in one distal end of the first half body 31 and each communicating with a corresponding one of the two threaded bores 36 for receiving the associated engaging bolt 37 therein.

Preferably, a passage 14 is vertically defined in an inner periphery of the base 10 for securely receiving and urging the head tube 51 therein. An annular extension 15 is formed on a top portion of the annular flange 11 and extends radially and inwardly therefrom to be rested on the upper end of the head tube 51.

In addition, a compression bowl 52 is inserted into a hole 152 defined in the annular extension 15 and is urged on an inner periphery of the head tube 51. A positioning nut 53 is threadedly engaged on an outer threaded portion 502 formed on the upper end of the steerer tube 50 and is rotatably urged on a ball chain 55 which is rotatably mounted in the compression bowl 52, thereby urging the compression bowl 52 on the inner wall of the head tube 51 and preventing the base 10 from detaching from the upper end of the head tube 51. Preferably, a washer 530 is fixedly mounted on the positioning nut 53 for sealing the compression bowl 52 and the ball chain 55.

Further, the cap 40 is rested on the positioning nut 53 and has a hole 42 defined therein for receiving the upper end of the steerer tube 50 therein. A second positioning nut 54 is threadedly engaged on the outer threaded portion 502 of the upper end of the steerer tube 50 and is urged on the cap 40, thereby preventing the cap 40 from detaching from the upper end of the steerer tube 50.

Referring to FIG. 2 with reference to FIG. 1, the cap 40 has three threaded cavities 410 each defined in the outer periphery thereof and equi-spaced with each other for securely receiving a corresponding one of the three first brake cables 61 therein. The annular sleeve 20 has three threaded cavities 240 each defined in the outer periphery thereof and each communicating with a corresponding one of the three cavities 410 for receiving the lower end of a corresponding one of the three first wires 612 therein.

Preferably, the lower end of each of the three first wires 612 is formed with a sphere 62. There are three arcuate recesses 250 each defined below and communicating with a corresponding one of the three threaded cavities 240 for receiving the associated sphere 62 therein.

In addition, the base 10 has three threaded cavities 130 each defined in the outer periphery thereof and equispaced with each other for securely receiving a corresponding one of the three second brake cables 71 therein. The swivel ring 30 has three threaded cavities 380 each laterally defined in the outer periphery thereof and each communicating with a corresponding one of the three cavities 130 for receiving the upper end of a corresponding one of the three second wires 712 therein.

Preferably, the upper end of each of the three second wires 712 is formed with a spherical body 72. There are three arcuate recesses 390 each defined above and communicating with a corresponding one of the three threaded cavities 380 for receiving the associated spherical body 72 therein.

In operation, the steerer tube 50 is actuated to rotate by a handlebar (not shown) of the bicycle so as to rotate the cap 40 synchronously, thereby rotating the annular sleeve 20 by means the first wires 612 connecting between the cap 40 and the annular sleeve 20. In such a situation, the upper connector 60 is rotated with the cap 40 freely without encountering hindrance. The annular sleeve 20 is rotated relative to the swivel ring 30 via the self-lubricating bearing 34 such that the base 10 and the lower connector 70 are not rotated with the cap 40 and the annular sleeve 20.

By such an arrangement, the handlebar can be rotated about 360° freely without causing the lower brake cables 71 to tangle.

Figure 3:
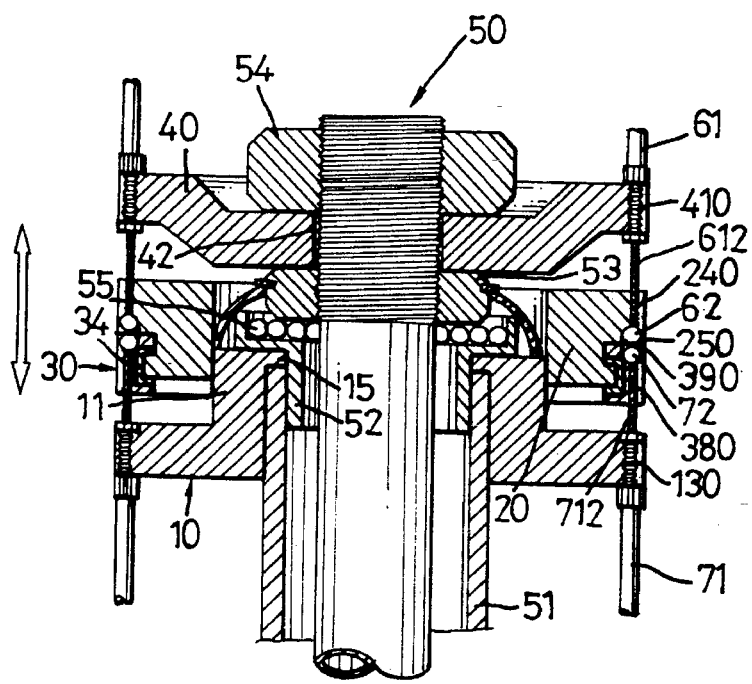
FIG. 3 is an operational view of FIG. 2.

Referring to FIG. 3, the three brake wires 612 can be lifted upwardly by means of a brake lever (not shown) of the bicycle, thereby moving the annular sleeve 20 together with the swivel ring 30 upwardly so as to lift the three second brake wires 712 upwardly which are in turn transmitted to urge a rear brake (not shown) of the bicycle, thereby achieving a brake effect to a rear wheel (not shown) of the bicycle.

Again referring to FIG. 1, in accordance with an alternative embodiment of the present invention, the upper connector 60 only includes two brake cables 61, two brake wires 612, and two spherical bodies 62, and the lower connector 70 only includes two brake cables 71, two brake wires 712 and two spherical bodies 72.

Two threaded cavities 41 are each defined in the outer periphery of the cap 40 for receiving a corresponding one of the two brake cables 61 therein. Two threaded cavities 24 are each defined in the outer periphery of the annular sleeve 20 for receiving a corresponding one of the two brake wires 612 therein. There are two arcuate recesses 25 each defined below and communicating with a corresponding one of the two threaded cavities 24 for receiving and positioning a corresponding one of the two spherical bodies 62 therein.

Similarly, two threaded cavities 13 are each defined in the outer periphery of the base 10 for receiving a corresponding one of the two brake cables 71 therein. Two threaded cavities 38 are each defined in the outer periphery of the swivel ring 30 for receiving a corresponding one of the two brake wires 712 therein. There are two arcuate recesses 39 each defined above and communicating with a corresponding one of the two threaded cavities 38 for receiving and positioning a corresponding one of the two spherical bodies 72 therein.

The operation of the two-wire type of separating brake module is similar to that of the three-wire type of separating brake module as described before and will not be illustrated in further details.

It should be clear to those skilled in the art that further embodiments of the present invention may be made without departing from the teachings of the present invention.

What is claimed is:

1. A swivel mechanism in a bicycle which comprises a head tube and a steerer tube rotatably mounted therein, said swivel mechanism comprising:

a base fixedly mounted around an upper end of said head tube and having an annular flange formed on an upperside thereof and extending upwardly therefrom;

an annular sleeve rotatably mounted around said annular flange wherein said annular sleeve has an annular ridge formed on an underside thereof, a groove defined in an inner periphery of a swivel ring, and a self-lubricating bearing rotatably received in said groove and rotatably mounted on said annular ridge;

said swivel ring mounted on the upperside of said base and rotatably mounted around the underside of said annular sleeve;

a cap securely mounted around an upper end of said steerer tube; and a separating brake module comprising:

an upper connector including at least one first brake cable fixedly mounted on an outer periphery of said cap, a first wire slidably mounted in said first brake cable and having a lower end fixedly mounted on an outer periphery of said annular sleeve; and a lower connector including at least one second brake cable fixedly mounted on an outer periphery of said base, a second wire slidably mounted in said second brake cable and having an upper end fixedly mounted on an outer periphery of said swivel ring.

2. The swivel mechanism in accordance with claim 1, wherein said base has at least one first cavity defined in the outer periphery thereof for securely receiving said second brake cable therein, said swivel ring has at least one second cavity defined in the outer periphery thereof and communicating with said first cavity for securely receiving the upper end of said second wire therein.

3. The swivel mechanism in accordance with claim 1, wherein said swivel rein includes first and second semicircular half bodies detachably coupled together.

4. The swivel mechanism in accordance with claim 1, wherein said cap has at least one first cavity defined in the outer periphery thereof for securely receiving said first brake cable therein, said annular sleeve has at least one second cavity defined in the outer periphery thereof and communicating with said first cavity for securely receiving the lower end of said first wire therein.

5. A swivel mechanism for a bicycle which comprises a head tube and a steerer tube rotatably mounted therein, said swivel mechanism comprising:

a base fixedly mounted around an upper end of said head tube and having an annular flange formed on an upperside thereof and extending upwardly therefrom;

an annular sleeve rotatably mounted around said annular flange;

a swivel ring mounted on the upperside of said base and rotatably mounted around an underside of said annular sleeve, wherein said swivel ring includes first and second semicircular half bodies detachably coupled together;

a cap securely mounted around an upper end of said steerer tube; and a separating brake module comprising:
  an upper connector including at least one first brake cable fixedly mounted on an outer periphery of said cap, a first wire slidably mounted in said first brake cable and having a lower end fixedly mounted on an outer periphery of said annular sleeve; and
  a lower connector including at least one second brake cable fixedly mounted on an outer periphery of said base, a second wire slidably mounted in said second brake cable and having an upper end fixedly mounted on an outer periphery of said swivel ring.

6. The swivel mechanism in accordance with claim 5, wherein said annular sleeve (20) has an annular ridge (22) formed on an underside thereof, a groove (33) defined in an inner periphery of said swivel ring (30), and a self-lubricating bearing (34) rotatably received in said groove (33) and rotatably mounted on said annular ridge (22).

7. The swivel mechanism in accordance with claim 5, wherein said cap has at least one first cavity defined in the outer periphery thereof for securely receiving said first brake cable therein, said annular sleeve has at least one second cavity defined in the outer periphery thereof and communicating with said first cavity for securely receiving the lower end of said first wire therein.

8. The swivel mechanism in accordance with claim 5, wherein said base has at least one first cavity defined in the outer periphery thereof for securely receiving said second brake cable therein, said swivel ring has at least one second cavity defined in the outer periphery thereof and communicating with said first cavity for securely receiving the upper end of said second wire therein.

* * * * *